J. H. BOYD.
TROLLEY GUARD.
APPLICATION FILED OCT. 11, 1913.
1,094,870.
Patented Apr. 28, 1914.
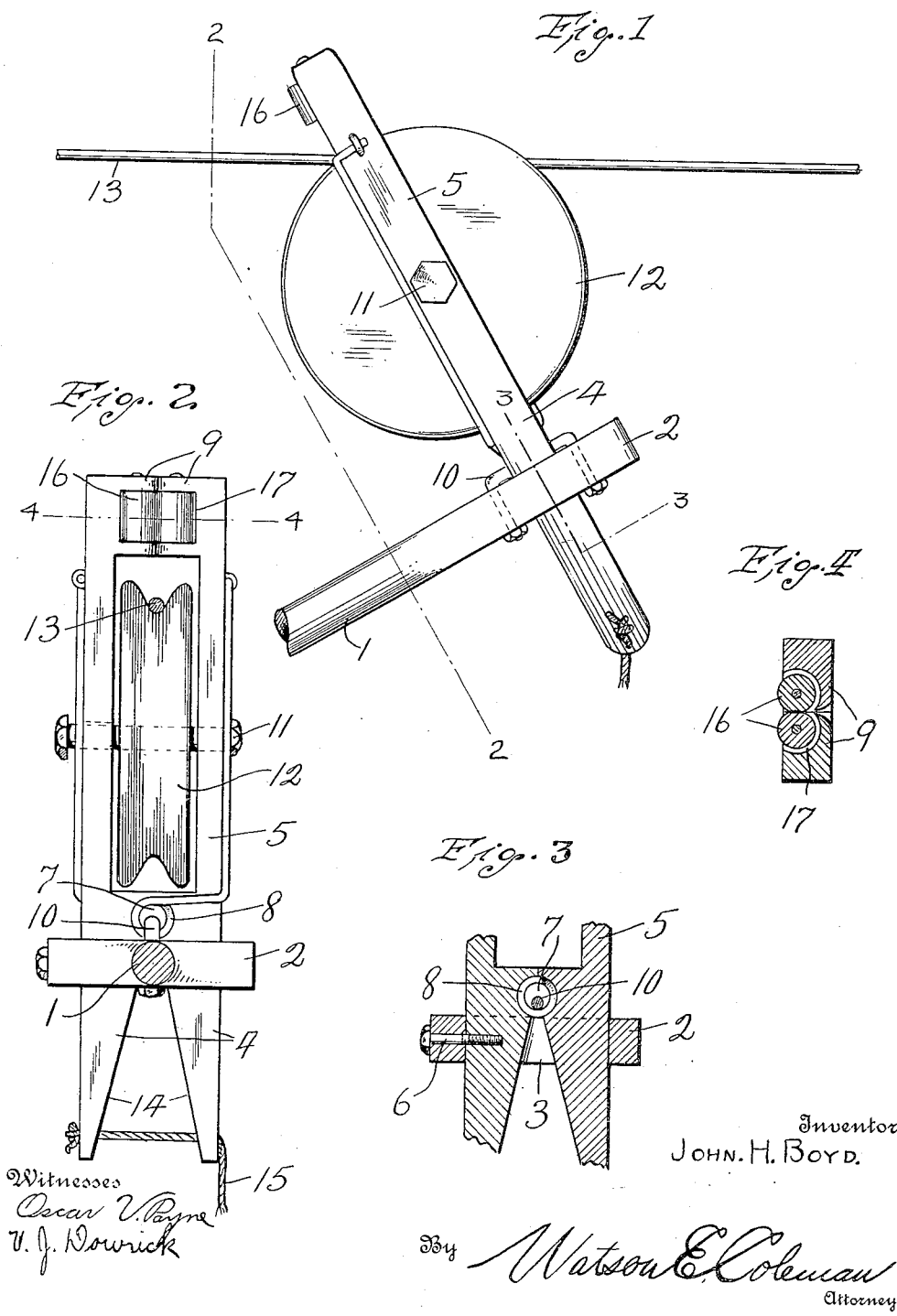
Inventor
JOHN. H. BOYD.
Witnesses
Oscar V. Payne
V. J. Dowrick
By Watson E. Coleman
Attorney

UNITED STATES PATENT OFFICE.

JOHN H. BOYD, OF CARLISLE, PENNSYLVANIA.

TROLLEY-GUARD.

1,094,870.  Specification of Letters Patent.  Patented Apr. 28, 1914.

Application filed October 11, 1913. Serial No. 794,655.

*To all whom it may concern:*

Be it known that I, JOHN H. BOYD, a citizen of the United States, residing at Carlisle, in the county of Cumberland and State of Pennsylvania, have invented certain new and useful Improvements in Trolley-Guards, of which the following is a specification, reference being had to the accompanying drawings.

This invention relates to new and useful improvements in trolley wheels, and more particularly to a means for retaining the same in engagement with the trolley wire and the primary object of the invention resides in providing a trolley pole having a pair of spring arms thereon to form the harp for the retention of the wheel therein.

A further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a fragmentary side elevation of a trolley pole showing my improved trolley harp applied to use thereon. Fig. 2 is a section therethrough, as seen on line 2—2, of Fig. 1. Fig. 3 is a section as seen on line 3—3, of Fig. 1, and Fig. 4 is a section as seen on line 4—4, of Fig. 2.

In describing my invention, I shall refer to the drawing in which similar reference characters designate corresponding parts throughout the several views and in which 1 indicates a trolley pole of the usual or any preferred design, having the outer end thereof enlarged as shown at 2. This enlarged portion is provided with a slot or opening 3, in which is disposed a pair of arms 4, the upper portions of which are designed to form substantially a harp 5. One of these arms is secured to the end wall of the opening 3 by means of a bolt or screw 6 and the inner opposed sides of said arms just above the slot 3, are provided with cavities which, together, form an opening 7. Arranged in this opening, is a coil spring 8, one end of which is extended and bent outwardly and upwardly to be engaged with the upper portion of the one arm 4 on the outer side edge thereof, while the opposite end of the spring is bent similarly to be engaged with the outer side edge of the other arm adjacent the upper end thereof. The tendency of this spring, therefore, is to force the upper ends of the arms inwardly toward one another and the upper ends of said arms are provided with the inwardly disposed extensions 9, which are adapted to contact with one another and complete the formation of the harp.

In order to secure the arms 4 in position, a U-shaped bolt 10 is provided, the base portion of which extends through the coil springs and the arms of which are depended through openings in the pole on opposite sides of the slot 3. Nuts are engaged with the free ends of the arms of the U-shaped bolt to secure the latter in position and it is obvious from this construction that the arms will be securely held in position in the outer end of the pole.

Extending somewhat loosely through the arms 4, intermediate the ends of the harp portion thereof, is a bolt or the like 11, designed to form a hub or axle portion to support a trolley wheel 12. This trolley wheel is of the usual or any preferred design and while somewhat loose in the harp, is slightly spaced from the upper extensions 9, to admit of the trolley wire 13 being received therein.

Portions of the arms 4 projecting below the portion 2 of the pole 1, have the inner side edges thereof beveled outwardly, as shown at 14, which provides a space therebetween. Extending through openings in the lower ends of these arms 4, is a cable 15 which is adapted to be limited in its movement in one direction so as to substantially engage one arm. This cable extends to the car carrying the pole and is adapted to be actuated by the conductor to raise and lower the pole when desired. In drawing downwardly upon the cable, it is obvious that the lower ends of the arms 4 will be drawn toward one another against the tension of the spring 8, thereby separating the upper ends of said arms and permitting the pole to be lowered, it being understood that the contacting upper ends of the arms 4 entirely inclose the trolley wire over the wheel 12.

As stated, the inwardly disposed extensions 9, at the upper ends of the arms 4 are adapted to contact with one another to entirely inclose the trolley wire over the trolley wheel and in order to permit this upper and closing portion of the harp to pass over the hangers (not shown), which support the trolley wire, rollers 16 are suitably mounted in cavities 17 of said extensions 9. These rollers contact one with the other and project slightly beyond the front faces of said arms 4. These rollers obviously permit the arms 5 to be separated as the same contact with the hangers supporting the trolley wire.

From the foregoing description of the construction of my improved device, the operation thereof will be readily understood and it will be seen that I have provided an improved guard for trolley wheels which will cause the wheel to constantly remain in engagement with the trolley wire. It will also be seen that the device is one which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. In a device of the class described, the combination with a trolley pole having a slot in the outer end thereof; of a pair of arms disposed in the slot of said pole to project above and below the same, the lower projecting portions of said arms being beveled to provide a space therebetween and the upper projecting portions of said arms being designed to form a harp, means to support said arms in position on the pole, a trolley wheel operatively supported between the harp portions of said arms, inwardly disposed extensions formed on the upper ends of said arms adapted for contact with one another, spring means in connection with said arms to normally retain the extensions in contact with one another, and means in connection with the lower projecting portions of said arms, whereby to separate the upper ends thereof.

2. In a device of the class described, the combination with a trolley pole having an opening therein; of a pair of arms disposed in said opening to project above and below said pole, the lower projecting portions of said arms being beveled outwardly toward their lower ends to provide a space therebetween and the upper projecting portions of said arms being designed to form a trolley harp, the contacting faces of said arms at a point above said pole being provided with registering cavities to form an opening therein, inwardly disposed extensions formed on the upper ends of said arms, a coil spring disposed in the last mentioned opening, the ends of said coil spring being bent in opposite directions and engaged, respectively with said arms, to normally force the upper portions thereof together, means to rigidly secure one of said arms to the trolley pole, additional means extending through the coil spring in the opening formed between said arms to additionally support said arms in position in the pole, and means in connection with the lower projecting portions of said arms whereby to separate the upper portions thereof.

In testimony whereof I hereunto affix my signature in the presence of two witnesses.

JOHN H. BOYD.

Witnesses:
C. M. LIGGETT,
S. J. MINNICH.

---

Copies of this patent may be obtained for five cents each, by addressing the "Commissioner of Patents, Washington, D. C."